United States Patent [19]
Webber et al.

[11] Patent Number: 4,769,401
[45] Date of Patent: Sep. 6, 1988

[54] WATER-BASED POLYOLEFIN ADHESIVE

[75] Inventors: James L. Webber, Miamisburg; John C. Weber, Springboro, both of Ohio

[73] Assignee: General Motors Corporation, Detroit, Mich.

[21] Appl. No.: 90,011

[22] Filed: Aug. 27, 1987

Related U.S. Application Data

[63] Continuation-in-part of Ser. No. 911,731, Sep. 26, 1986, abandoned.

[51] Int. Cl.[4] ..................... C08L 63/00; C08L 79/02; C08L 33/16
[52] U.S. Cl. .................................. 523/411; 525/113; 428/261
[58] Field of Search .................... 523/411; 525/113

[56] References Cited

U.S. PATENT DOCUMENTS

| | | | |
|---|---|---|---|
| 3,107,228 | 10/1963 | Cappuccio | 525/113 |
| 3,512,919 | 5/1970 | Cappuccio | 525/113 |
| 3,678,098 | 7/1972 | Lewis | 526/292.2 |
| 3,786,113 | 1/1974 | Vassileff | 260/536 |
| 4,104,230 | 8/1978 | Chang | 523/411 |
| 4,225,480 | 9/1980 | Schimmel | 523/411 |
| 4,420,583 | 12/1983 | Hutton | 523/408 |
| 4,433,079 | 2/1984 | Kobayashi | 523/402 |
| 4,510,274 | 4/1985 | Okazaki | 523/411 |

Primary Examiner—C. Warren Ivy
Attorney, Agent, or Firm—R. W. Tung

[57] ABSTRACT

A high bond strength, high heat resistant water-based adhesive designed for bonding a vinyl substrate to a polyolefin surface.

2 Claims, No Drawings

WATER-BASED POLYOLEFIN ADHESIVE

This is a continuation-in-part of U.S. patent application Ser. No. 911,731 filed Sept. 26, 1986, which is now abandoned.

FIELD OF THE INVENTION

The present invention generally relates to a high strength heat resistant water-based adhesive and, more particularly, is concerned with a high strength heat resistant water based adhesive that is specifically designed for bonding to a polyolefin surface.

BACKGROUND OF THE INVENTION

Polyolefins are frequently the material of choice for a variety of thermoplastic parts because of their relatively low cost and superior physical properties. Polyolefins are desirable materials for many automobile interior parts for the same reasons plus the fact that polyolefins have excellent resistance to solvents and moisture. However, in contrast to their superior physical properties, polyolefins are very difficult materials to bond to which limited their usage. The causes for the difficult bonding property are low surface tension and chemical inertness of the polyolefins.

In automobile interior applications, many of the luxury versions of interior trim parts are cloth covered for improved appearance. The technology for bonding polyolefins such as polypropylene with a solvent-based primer followed by a solvent-based adhesive is widely known. It would have been an easy task to find a workable solvent-based adhesive system for the bonding of polypropylene parts. In cases where the polyolefin surface is first treated by methods like corona or gas plasma treatment, the use of a solvent-based primer may not be necessary.

The use of solvent-based adhesives and solvent-based primers in a factory environment has been disfavored in recent years. In order to meet the stringent solvent emissions requirements set up by the Environmental Protection Agency, a variety of manufacturing operations which utilizes solvent based adhesives must be changed over to water-based adhesives. Many new manufacturing operations must also be designed with water-based adhesive systems such that the use of solvents can be completely eliminated.

Replacing a solvent-based adhesive with a water based adhesive in bonding a polyolefin such as polypropylene is a very difficult task. This is because water is a polar solvent and polypropylene is a nonpolar material. When water is used as the solvent for an adhesive composition, surface treatment on the substrate is necessary in order to lower the surface tension to allow water to adequately wet the surface.

It is therefore an object of the present invention to provide a water-based adhesive composition for bonding to a polyolefin surface.

It is yet another object of the present invention to provide a water-based adhesive composition for bonding to a polyolefin surface which forms a bond of high strength and high temperature resistance.

It is a further object of the present invention to provide a water based adhesive composition for bonding to a polyolefin surface which forms a bond that is moisture-resistant.

SUMMARY OF THE INVENTION

In accordance with a preferred embodiment of our invention, a water-based adhesive formulation for bonding to a polyolefin surface can be formulated.

Our novel water-based adhesive composition is comprised of three components. The first component is a modified acrylic copolymer in an emulsion form containing approximately 58% solids. By modified we mean a copolymer composition containing 90–98% ethyl acrylate and 2–10% propylene chlorohydrin dimethyl ammoniumethyl methacrylate. This modified acrylic copolymer emulsion has a self-crosslinking system which means that at alkali pH values, the monomers in the emulsion oecome self-reactive and the polymers crosslink themselves by slow reaction at room temperature. Even though it has good adhesive properties, it does not by itself adhere well to polyolefins, nor does it have the heat resistance properties necessary for most automotive applications.

The other two components used in our novel adhesive are utilized for their-specific functions. The first is a water solution of polyethyleneimine containing 33% solids. This component is added to our water-based adhesive composition to improve bonding to a treated polypropylene surface. It also helps to crosslink the acrylic emulsion for increased heat resistance through the functional groups used in self crosslinking.

The third component of our novel adhesive formulation is an epoxy resin dispersion in water containing approximately 57% solids. This component is added to improve heat resistance and to provide initial tack of our water-based adhesive. As an added benefit, the epoxy resin also lowers the surface tension of the adhesive which allows it to wet a less polar surface. The epoxy resin system we used is cured by the polyethyleneimine through standard amine/epoxy chemistry.

Our novel water-based adhesive composition can be used as a two-component system. The acrylic copolymer emulsion and the epoxy resin dispersion are first mixed together as a stable component. The polyethyleneimine water solution is added as another component just before the adhesive is used. The resulting adhesive composition is initially tacky for good substrate wetting property and then cured into a bond having high strength and high heat resistance. Our mixed adhesive composition has a pot life of approximately 6 hours.

DETAILED DESCRIPTION OF THE INVENTION

In our search for a water based adhesive formulation for bonding to a polyolefin surface, we have found that of all the water-based adhesives commercially available, very few lend themselves to the automotive industry. An automobile interior is subjected to a severe heat and humidity environment which causes most water-based adhesives to fail. Two groups of water-based adhesives, characterized by their base polymers of acrylics and urethane, were proven useful to the automotive industry. Urethanes usually require a crosslinking agent for humidity resistance. Acrylics need a crosslinking system for heat resistance in almost all automotive applications. We have evaluated a large number of commercially available water-based adhesives for adhesion to treated and untreated polypropylene surfaces. None of these adhesive samples came close to meeting the bond requirements specified for automotive interior parts.

Our novel water-based adhesive composition was specifically designed for laminating a vinyl backed cloth to injection molded polypropylene trim parts The vinyl backed cloth is first heated to approximately 300° F., then draped over the adhesive covered part. A vacuum is applied under the part to conform the vinyl backed cloth to the part. The vinyl backed cloth is then trimmed and the edges turned onto the back side of the part. The adhesive bond between the vinyl and the polypropylene substrate is required to pass specific adhesive specifications used in the automotive industry. For instance, a vinyl backed cloth must be bonded to an injection molded polypropylene substrate with a minimum 10 lb/in peel strength when tested at 72° F. The adhesive must also adhere the vinyl/cloth edges to the back side of the part after vacuum forming is completed. The assembled part must pass an environmental cycling test at temperatures of 180° F., −40° F., and 100° F. at 100% relative humidity without loss of adhesion or peeling edges. We have followed the ASTM Standard Test Procedure D-903 for testing of peel strength.

We evaluated a number of polyolefin adhesion promoters and additives such as organofunctional silanes, organofunctional titanates, chromium complexes, polyethyleneimine, chlorinated polyolefins/paraffins, sulfonyl azide silane, propylene/maleic anhydride graft copolymers, phenolic resin, epoxy resin, and isocyanates. We found that many of these adhesion promoters or additives did very little to improve the bond strength. Most of them are used for increasing adhesion of inorganic fillers in polypropylene composites to improve the overall material properties. Others are used exclusively in solvents and will not dissolve in water. Only two of these adhesion promoters significantly increases adhesion to a corona discharge treated polypropylene substrate. The first of these is an isocyanate. Isocyanates are typically used in urethane based adhesive systems. However, isocyanates react with water very rapidly giving the adhesive a pot life on the order of 30 minutes. An adhesive system of this type would require two component spray equipment and would not be suitable in a production environment. The other adhesion promoter, polyethyleneimine worked well in improving the bond strength to polypropylene substrate. It is also water soluble and therefore compatible with an acrylic emulsion adhesive system.

We have found that polyethyleneimine is extremely reactive toward most acrylic based adhesives to the extent that an acrylic adhesive sprayed over a polyethyleneimine primer would gel on contact. The only exception to this fast reactivity we have found is a self-crosslinking acrylic emulsion system that can be cured over a period of hours. We think the polyethyleneimine in the adhesion formulation provides the adhesion to a polypropylene substrate while the acrylic emulsion provides the adhesion to the other substrates such as vinyl.

Our modified acrylic emulsion which contains approximately 58% solids is a copolymer of 90-98% ethyl acrylate and 2-10% propylene chlorohydrin dimethyl ammoniumethyl methacrylate. A detailed procedure on the synthesis of this copolymer can be found in U.S. patent 3,678,098 which is incorporated herein by reference. This copolymer is commercially available from the Rohm & Haas Co. A typical monomer structure of propylene chlorohyirin dimethyl ammoniumethyl methacrylate is given as:

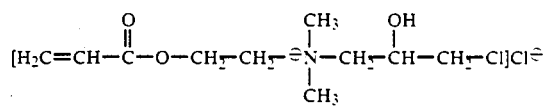

The emulsion is a milky white liquid containing 57 to approximately 59% solid. It has a pH value of 4.2, a density at 25° C. of 8.8 lbs/gal., and a Brookfield LVF viscosity of 2000-4000 cps (#6 spindle at 20 rpm).

A third component, an epoxy resin dispersion, is added to our water-based adhesive composition to improve the initial tack and to provide higher heat resistance through curing reactions with the polyethyleneimine. We used an epoxy resin dispersion containing 57% solid commercially available from the Celanese Corporation under the designation of CMD-W55-5003. This epoxy resin dispersion is a non-ionic aqueous dispersion of a polyfunctional aromatic epoxy resin with an average functionality of 3. The typical properties of this epoxy resin dispersion are as follows: an epoxide monomer weight of 205, a pH value of 7, a density of 9.2 lbs/gal, an average particle size of smaller than 1.5 microns, and a viscosity at room temperature of 10,000 cps as determined by Brookfield RVT (#5 spindle at 10 rpm).

The polyethyleneimine we used in our novel adhesive composition was obtained from Virginia Chemical under the tradename of CORCAT® P-600. It is a 33% aqueous solution of polyethyleneimine which has a minimum molecular weight of 60,000. The aqueous solution has a maximum viscosity at 25° C. of 5,000 cps.

The composition of our novel water based adhesive is shown in table 1.

TABLE 1

| Component | Weight Percent |
| --- | --- |
| Modified Acrylic Copolymer Emulsion | 75 ~ 94 |
| Epoxy Resin Dispersion | 5 ~ 15 |
| Polyethyleneimine | 1 ~ 10 |

For polyethyleneimine, we have found that a workable weight percentage range is between 1-10%. When less than 1 wt. % polyethyleneimine was added to our composition, no improvement in the adhesive properties was observed. The upper limit of polyethyleneimine to be used was determined by the consideration of pot life of the mixed adhesive composition. At a weight % higher than 10, the pot life of the mixed adhesive composition is less than 1 minute and therefore not feasible for production use. The weight % epoxy resin dispersion used in our composition is between 5 to 15 depending upon the heat resistance properties desired. We have found that a suitable water-based adhesive composition contains 3 wt. % polyethyleneimine, 10 wt. % epoxy resin dispersion, and 87 wt. % modified acrylic copolymer emulsion for bonding vinyl to polypropylene.

We have pretreated surfaces of some of our polypropylene substrates with a corona discharge method. This method was chosen primarily due to the hazards involved with other treatment methods such as flame treatment, chemical etching, peroxide treatment, with UV light. In a corona discharge treatment, a high voltage arc is generated in the vicinity of the polyolefin surface. The ozone created by the arc and the electrical potential combine to oxidize the surface of the polyolefin. We selected a machine that was designed specifically for the treatment of three dimensional plastic objects. The particular machine chosen was supplied by the Lectrotreat Engineering Co. sold as Plastic Surface Treater. It is approximately 10 ft long with an 8 in ×9 in opening in the treatment tunnel. The first 5 ft of the treatment tunnel have vertical arcs and the last 5 ft have horizontal arcs. The arcs are generated between parallel capacitor plates located in the tunnel walls. A conveyor carries the part through the tunnel. The treatment machine is used at full power of approximately 9 watts in all our treated samples.

To be useful in a production environment, an adhesive composition and its components must have a relatively long shelf life. It is therefore an important task to determine that the components were indeed stable as mixed. We have mixed our water based adhesive composition as a two-component system. The first component is a mixture of the modified acrylic copolymer emulsion and the epoxy resin dispersion. The second component is a water solution of polyethyleneimine. The two components are mixed just before using and have a shelf life of approximately 6 hours after mixing. We studied the viscosity of our pre-mix of acrylic emulsion and epoxy resin dispersion to insure its stability. We have found that the viscosity of our pre-mix increases over a period of a week for a total change in viscosity of approximately 2200 cps. The viscosity then remains stable thereafter. We have also found that the age of this pre-mixed component does not affect the adhesive performance. We then studied the viscosity of a mixed adhesive over the pot life of the material. The viscosity gradually increases until the adhesive gels to a cottage cheese like consistency giving a pot life of approximately 6 hours. We have found that by adding water, not only the initial viscosity is decreased but also the rate of viscosity increase is slowed down. The amount of water added can be adjusted to give the optimum level of pot life and sprayability.

The application of a mixed adhesive composition to a polypropylene substrate is described as follows: The mixed adhesive composition is first sprayed over the entire substrate. The adhesive is initially an opaque white color and dries to a clear finish. To aid in the identification of the adhesive thickness, a carbon-black dispersion is added to the adhesive. The adhesive becomes gray after mixing and is visible after spraying on a polypropylene substrate. After drying, the adhesive appears to be a semi-transparent dark gray color. The more of the adhesive sprayed, the darker the color gray. This gives a good visual indication of the adhesive thickness. The carbon black dispersion is initially added to the curative portion of the adhesive, i.e., the water solution of polyethyleneimine. It also serves to indicate a good curative mixing.

Some of the physical properties of our pre-mixed components and the mixed adhesive are shown in table 2.

TABLE 2

|  | Adhesive | Curative | Mixed Adhesive |
|---|---|---|---|
| Appearance | Milky white liquid | Thin black liquid | Milky grey liquid |
| Solids | 55–57% | 12–13% | 52–54% |
| pH | 4–5 | 8–9 | 7–8 |
| Storage | Protect from freezing | Stable | — |
| Usable Life | 6 mo. | 6 mo. | 6 hrs. |
| Density | 8.8 lb/gal. | 8.4 lb/gal. | 8.8 lb/gal. |
| Viscosity | 5000–7000 cps | 25–35 cps | 2000–6000 cps |

The bond strength of our water base adhesive was tested after cloth covered vinyl sheets were bonded to polypropylene substrates. At 72° F. test temperature, a minimum bond strength of 10 lb/in was obtained. In some cases, the bond strength achieved was as high as 12–14 lb/in. After environmental cycling test at 180° F., −40° F., and 100° F. at 100 % relative humidity, no loss of bond strength was observed in our samples. In some applications where edge wrap on a part is required, a primer is necessary to achieve the desirable bond strength. The reason for adding the primer is to improve the wet out of the adhesive. A vinyl sheet normally must be heated to over 160° F. in order to achieve sutiable wet out of the adhesive. When an edge wrap is performed at room temperature, a primer is needed to improve the wet out. The primer we have used, a carboxylated ethylene-vinyl acetate emulsion reacts with the adhesive to gain additional bond strength. It was supplied by Air Products Co. under the tradename of AIRFLEX® 416.

In other applications where polyolefin materials other than polyropylene are to be bonded, a slow active solvent may be added to the adhesive formulation to improve bond strength. The solvent to be added will depend on the particular material which is to be bonded to the polyolefins. The solvent must be slower evaporating than water such that it remains in the adhesive. One particular solvent we have used in bonding polyethylene is n-methyl pyrolidone supplied by the GAF Corp. under the 25 tradename of M-PYROL®. The percentage added was in the range between 0 to 10 wt. %. The percentage of modified acrylic emulsion used was then reduced accordingly.

While our invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. A high bond strength, heat resistant water-based adhesive composition for bonding to a polyolefin surface comprising
    75 to 94 weight percent of total composition an emulsion containing about 58% solids of a copolymer of 90-98% ethyl acrylate and 2-10% propylene chlorohydrin dimethyl ammoniumethyl methacrylate,
    5 to 15 weight percent of total composition an water-based epoxy resin dispersion containing about 57% solids, and
    1 to 10 weight percent of total composition an aqueous solution containing about 33% solids of polyethyleneimine.

2. A high bond strength, heat resistant water-based adhesive composition for bonding to a polyolefin surface comprising
    75 to 94 weight percent of total composition an emulsion having about 58% solids of a copolymer of 90-98% ethyl acrylate and 2-10% propylene chlorohydrin dimethyl ammoniumethyl methacrylate,
    5 to 15 weight percent of total composition an water-based epoxy resin dispersion containing about 57% solids, and
    1 to 10 weight percent of total composition an aqueous solution containing about 33% solids of polyethyleneimine,
    said composition when used in bonding a vinyl backed cloth to a polyolefin surface provides a minimum bond strength of 10 lbs/in when tested according to ASTM Standard Test Procedure D-903.

* * * * *